Jan. 12, 1932.  J. GSTYR  1,841,244
CUTTER GRINDING MACHINE
Filed Dec. 30, 1925   9 Sheets-Sheet 5

INVENTOR
Joseph Gstyr
BY Schlesinger
his ATTORNEY

Jan. 12, 1932.    J. GSTYR    1,841,244
CUTTER GRINDING MACHINE
Filed Dec. 30, 1925    9 Sheets-Sheet 6
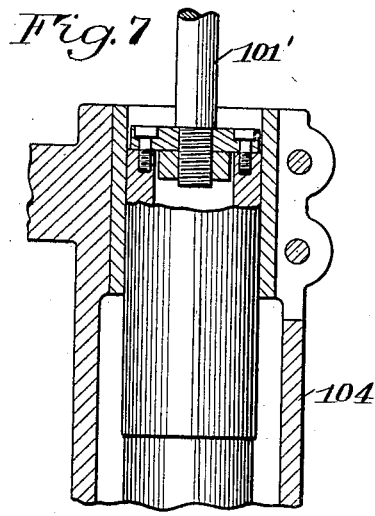
Fig. 7
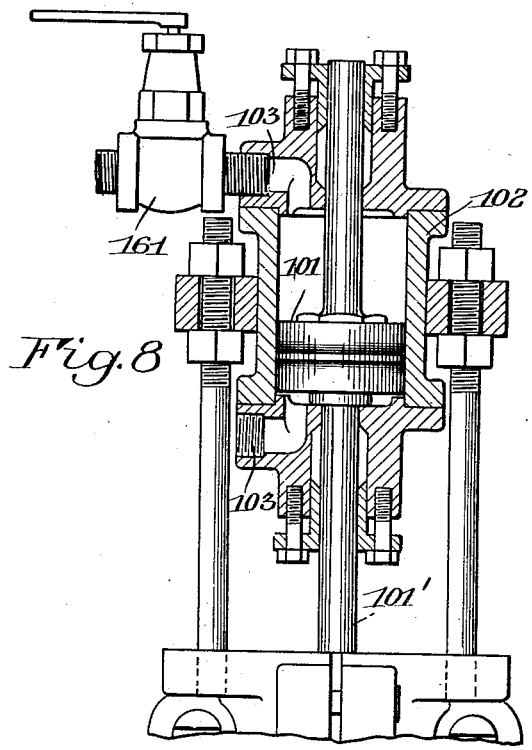
Fig. 8
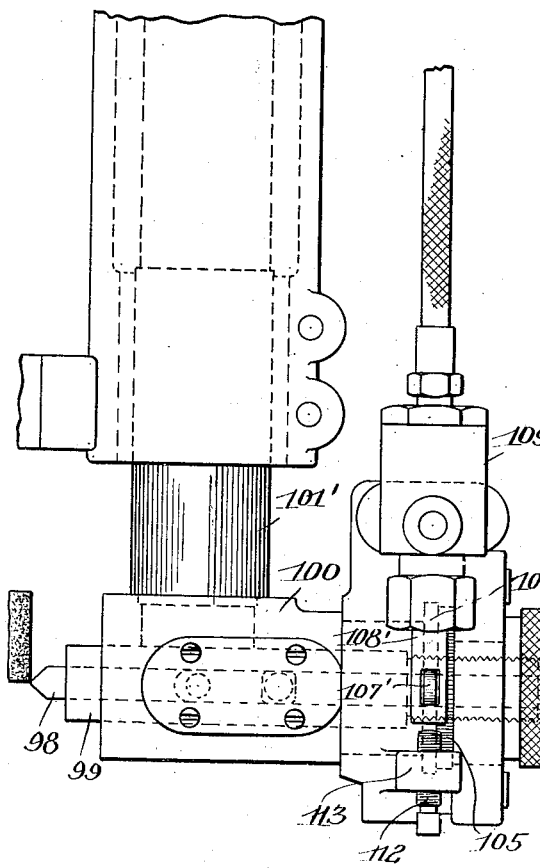
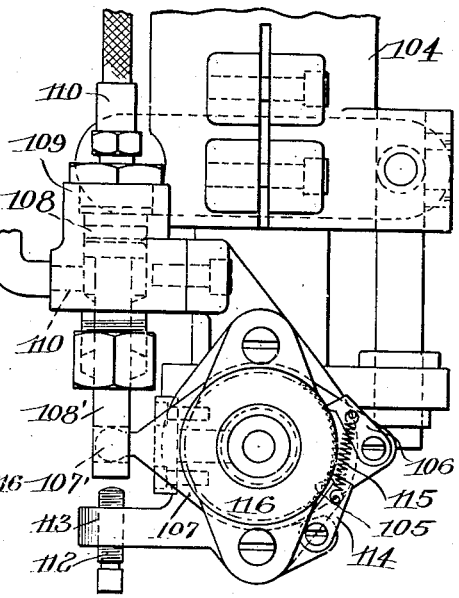
INVENTOR
Joseph Gstyr
BY Schlesinger
his ATTORNEY Jan. 12, 1932.  J. GSTYR  1,841,244
CUTTER GRINDING MACHINE
Filed Dec. 30, 1925  9 Sheets-Sheet 7

INVENTOR
Joseph Gstyr
BY
his ATTORNEY

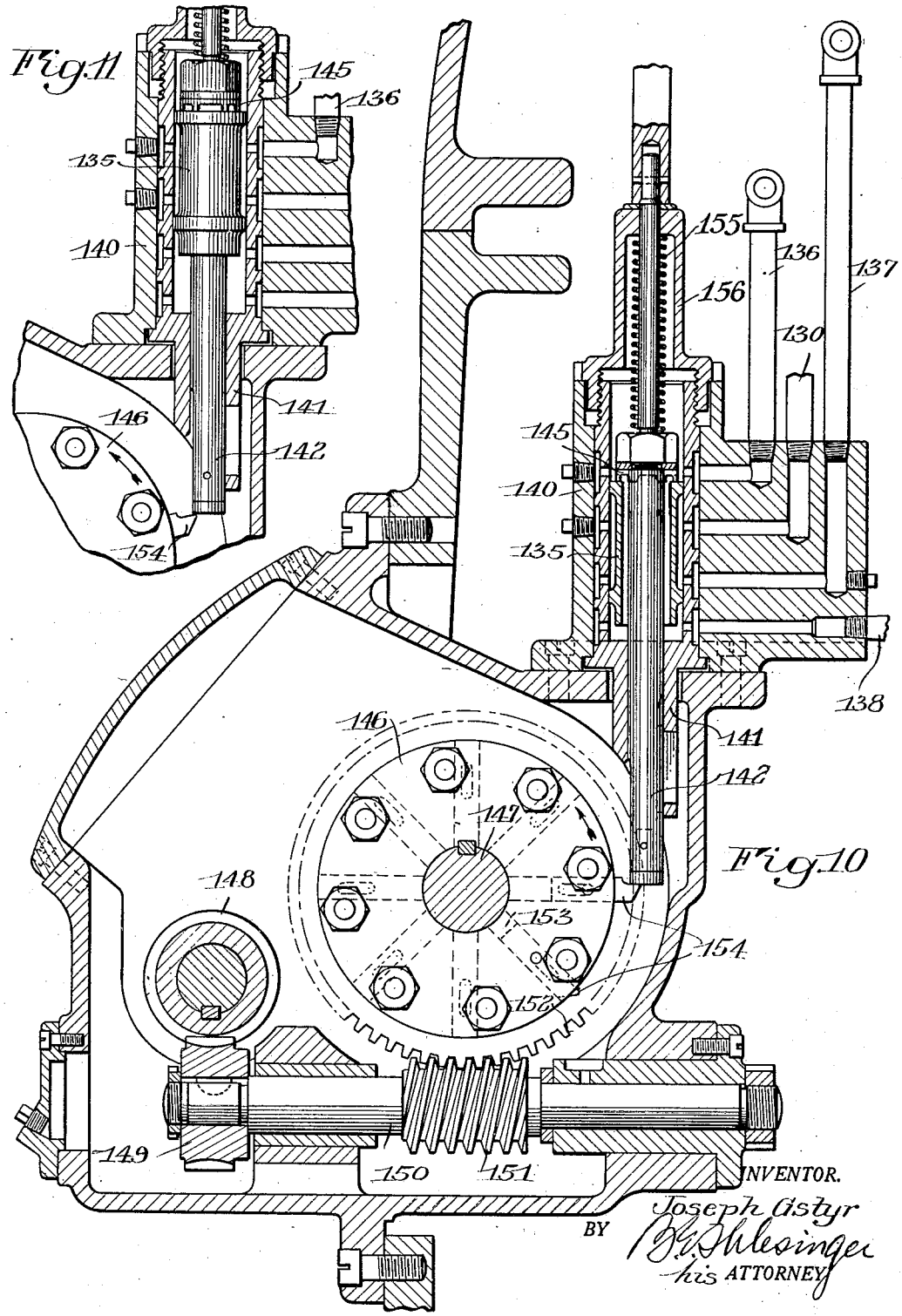

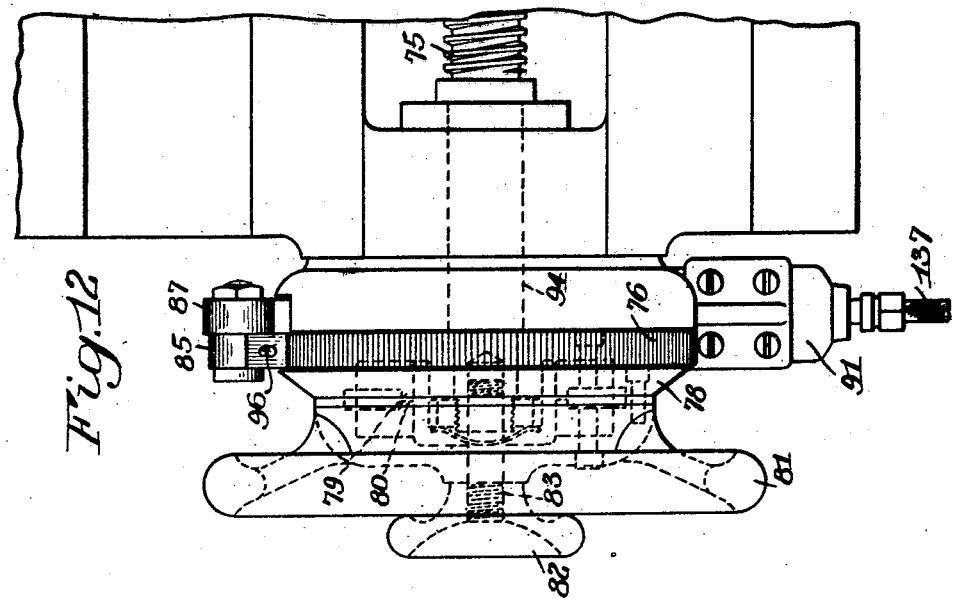
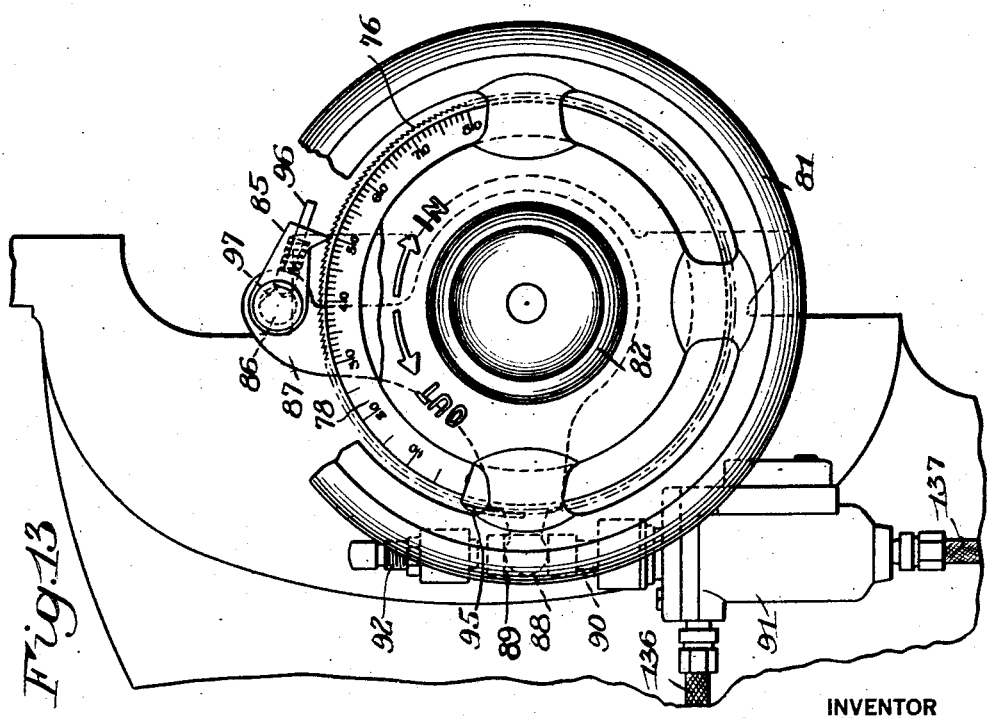

Patented Jan. 12, 1932

1,841,244

UNITED STATES PATENT OFFICE

JOSEPH GSTYR, OF ROCHESTER, NEW YORK, ASSIGNOR TO GLEASON WORKS, OF ROCHESTER, NEW YORK, A CORPORATION OF NEW YORK

CUTTER GRINDING MACHINE

Application filed December 30, 1925. Serial No. 78,361.

The present invention relates to grinding machines and to dressing mechanism for grinding machines. In particular the present invention relates to a machine for grinding cutter blades, such as are employed in the production of longitudinally curved tooth gears.

One object of this invention is to provide means for automatically dressing a grinding wheel while in operative position.

A further object of this invention is to provide means for automatically and periodically feeding a grinding wheel relative to the work being ground, thereby to take up wear on the grinding wheel.

A further object of the invention is to provide means whereby fluid pressure may be employed to actuate a grinding wheel dressing element and to periodically feed the grinding wheel relative to the work being ground.

A further object of the invention is to provide a machine for grinding cutter blades, particularly those employed in cutting curved tooth gears, upon which the cutter blades can be ground and finished accurately and expeditiously.

A still further object of this invention is to provide in such a cutter grinding machine means for dressing and feeding the grinding members which will be simple and accurate in operation.

Other objects of the invention will be apparent hereinafter from the specification and from the recital of the appended claims.

One embodiment of the present invention is illustrated in the accompanying drawings, in which I have disclosed a machine for grinding cutters employed in producing curved tooth gears. It will be understood, however, that the invention is capable of further modification and of other uses within its scope and within the limits of the appended claims.

The present invention is an improvement on the patent to J. E. Gleason 1,285,124— November 29, 1918.

In the drawings:

Fig. 7 is a view, partly in section, of the dressing apparatus for the machine;

Fig. 8 is a view, partly in section, taken generally at right angles to Fig. 7;

Fig. 10 is a sectional view on the line 10—10 of Fig. 9, showing one of the control valves and the mechanism for actuating the same;

Fig. 11 is a detail, showing certain of the parts shown in Fig. 10 in different position;

Fig. 12 is a detail view, showing in side elevation the mechanism for feeding the grinding wheel slide;

Fig. 13 is a plan view of the mechanism shown in Fig. 12;

Fig. 14 is a sectional view through the cylinder employed for positioning one of the grinding wheels; and Fig. 15 is a detail of the work spindle lubricating mechanism.

Figure 1:
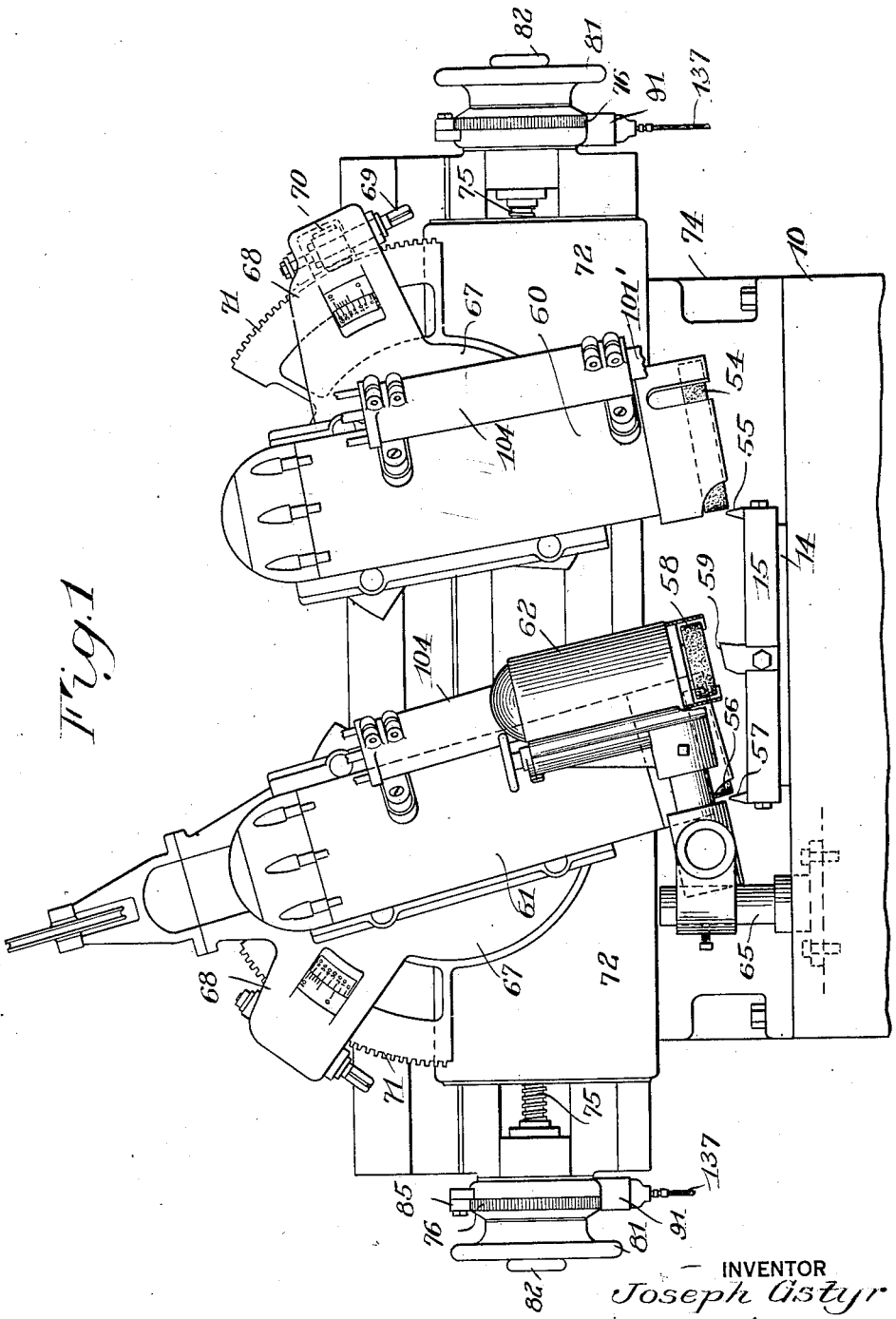
Fig. 1 is a partial front elevation of a cutter grinding machine constructed according to one embodiment of this invention.

In the drawings I have illustrated one form of machine constructed according to this invention particularly suited for grinding cutter blades, more particularly, cutter blades employed in producing longitudinally curved tooth gears. This machine is designed for the purpose of relieving these cutter blades so as to afford the necessary clearance for the blades when in cutting engagement with the blank. This machine includes a support for the blades to be ground, means for supporting a plurality of grinding wheels in operative relation to the blades and means for imparting a relative relieving motion between the grinding wheels and the blades during the grinding operation. In a machine of this character, preferably three grinding wheels will be utilized, one to grind each of the side surfaces of the blades and the other to grind the top surface thereof. All three of the grinding wheels may be operated in engagement with the cutter blades simultaneously or only one grinding wheel may be employed at a time.

The present invention provides means for dressing the grinding wheels during the grinding operation, periodically, and means for periodically feeding the grinding wheels relative to the work or cutter blade support to take up for wear on the grinding wheels or for other purposes.

Figure 5:
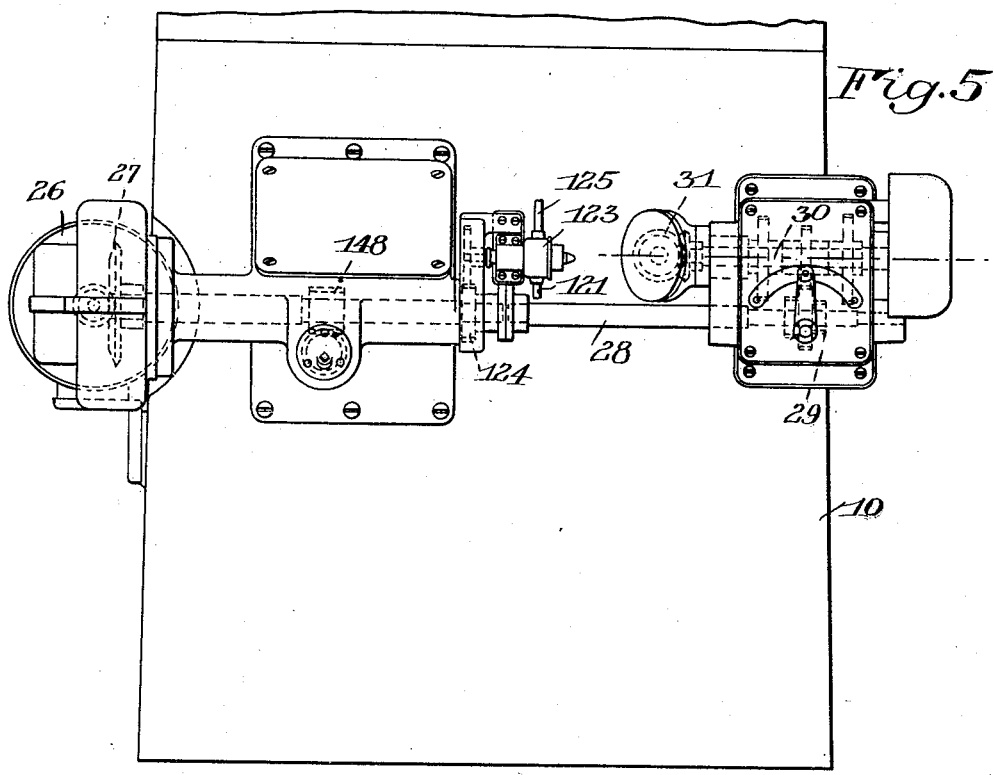
Fig. 5 is a partial rear elevation of the machine.

Referring to the drawings by numerals of reference. In the embodiment of the invention shown, 10 indicates a frame provided with suitable bearings 11 and 12 in which is mounted the spindle 13 to which is secured the work or cutter blade support 14. The cutter head 15 may be secured to this support 14 is any suitable manner. Keyed to the spindle 13, intermediate its length, is a member 16 provided with an annular flange 17. Secured to this flange 17 is a key or keys 18 which engage in recesses 19 formed in the annular flange of the worm wheel 20. This worm wheel 20 is rotated by the worm 21 which is in mesh therewith, the worm 21 being mounted upon a shaft 22 to which is secured adjacent one end a bevel gear 23 (Fig. 2) which is driven from the shaft 24 through either of the bevel gears 25, forming part of an ordinary reversing mechanism. The shaft 24 is driven by means of a motor 26 (Fig. 5) through the bevel gearing 27, the shaft 28, one set of a group of speed change gears 29, of any usual or suitable structure, the shaft 30 and the bevel gears 31.

The structure which has thus far been described constitutes a means for rotating the cutter head 15 continuously during the grinding operation. The cutter head is turned so as to present the cutting edges of the blades B secured thereto initially to the grinding members, or in other words the blades are moved in the same direction as when operating upon a gear blank. The purpose of the machine illustrated is to relieve the outer end and side surfaces of these blades B to permit each blade to properly clear the blank as it travels through the tooth space being cut. To secure the desired relief and in order to finish the surfaces of the blades to the proper contour, a relative relieving motion is imparted between the blades and the grinding members. In the machine illustrated this relieving motion consists in a reciprocatory movement of the cutter blades relative to the grinding member, during the grinding operation.

Figure 2:
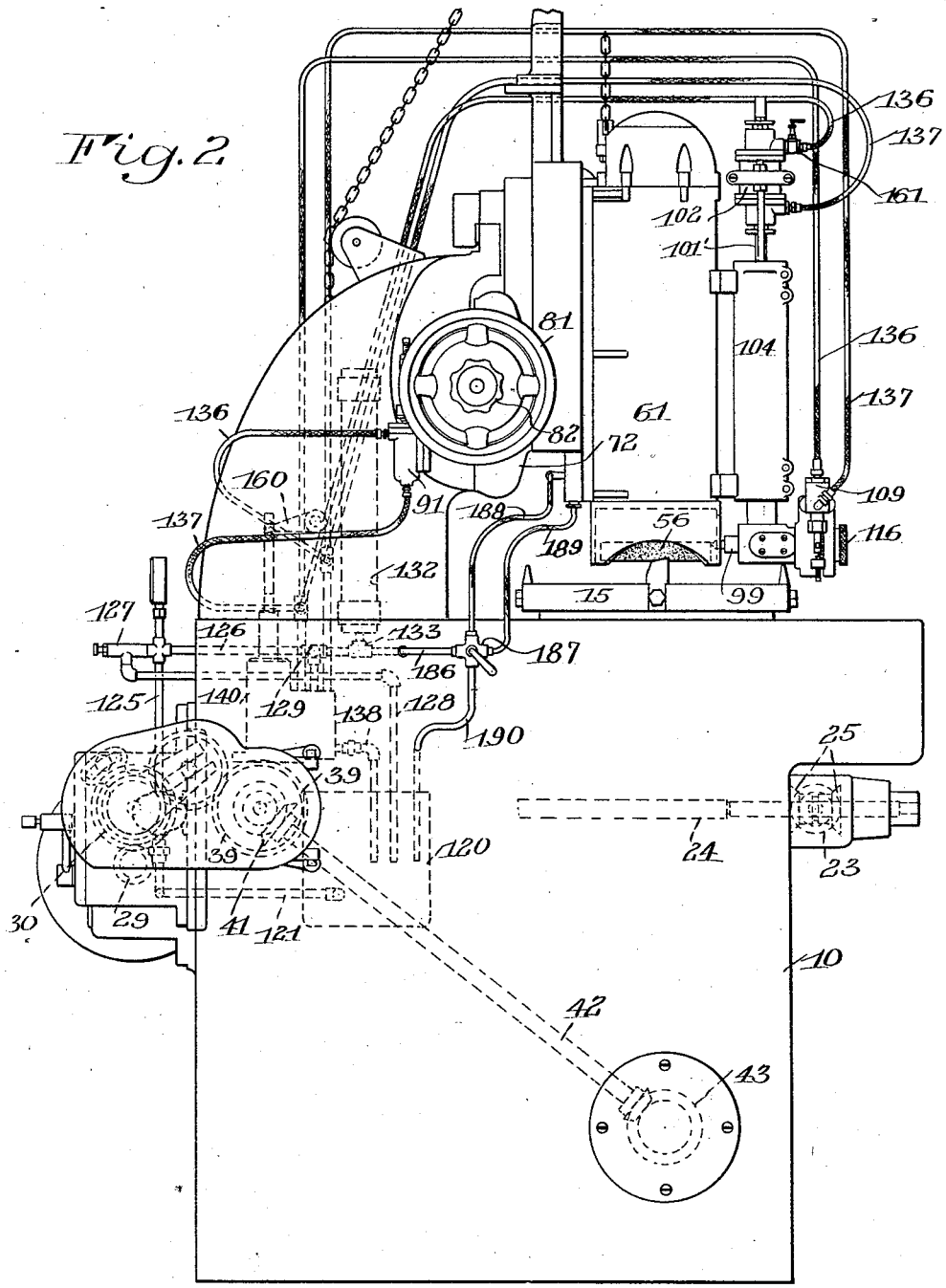
Fig. 2 is a side elevation of this machine.
Figure 3:
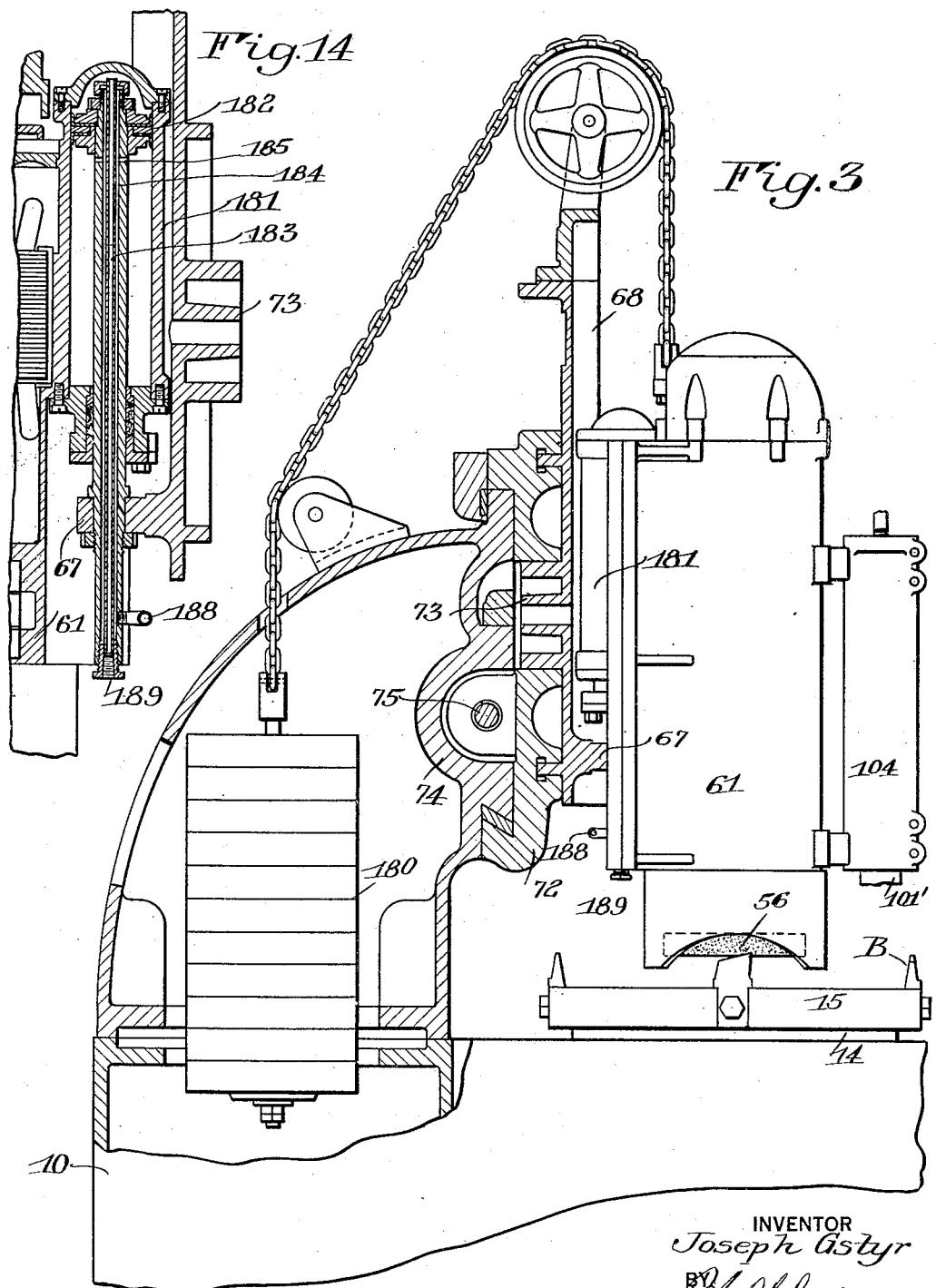
Fig. 3 is a side elevation, partly in section, on a larger scale than Fig. 2 showing details of the grinding wheel adjustments.
Figure 6:
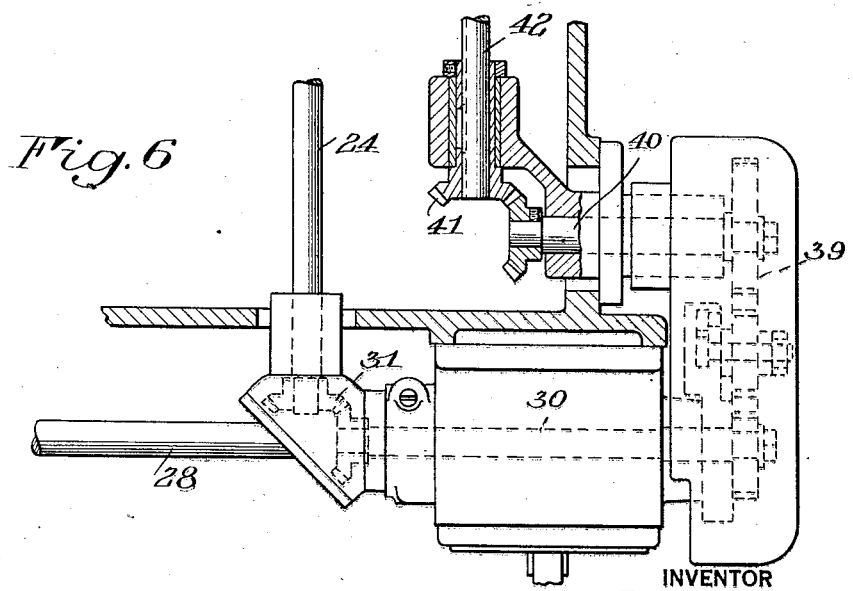
Fig. 6 is a detail of the drive employed in operating the machine.

To this end, there is secured to the spindle 13, adjacent its lower end, a member 32 which is reciprocable in a guide 33 formed on the frame 10 and which is adapted to transmit its reciprocation to the spindle 13 and the cutter head secured thereto. The member 32 is slotted, as at 34 to receive a rotary cam member 35 and the shaft 36 upon which the cam 35 is mounted. This cam 35 cooperates with a roller 37 mounted in a recess 38 formed in the member 32. Rotation of the shaft 36 and the cam 35, accordingly, will reciprocate the member 32 and the spindle 13 to which said member 32 is secured. The shaft 36 is driven from the main drive shaft 28 through the change gears 39 (Fig. 6), the shaft 40, the bevel gears 41, the shaft 42, and the bevel gears 43 (Fig. 2).

The member 32 may be secured to the spindle 13 in any suitable manner. As shown, the spindle 13 is provided with a shoulder 44 between which and the nut 45 threaded on said spindle is secured the bearing housing 46 housing the thrust bearing 47. The upper face of the member 32 contacts with the lower face of the bearing housing 46, and this member 32 is secured to a sleeve 48 which is provided with an internal flange 49 which seats on the upper face of the bearing housing 46. The member 32 is thus connected to the spindle 13 through a thrust bearing which absorbs any shock or thrust arising in the transmission of motion from the cam 35 to the spindle 13. To assist in returning the member 32 and the spindle to lower position after each upward stroke, springs 50 are provided which seat on pins 51 secured in the flange 52' of a sleeve or dust guard 52 secured to the bearing 12 and which are interposed between said flange 52' and a flange 53 formed on the sleeve 48.

Figure 4:
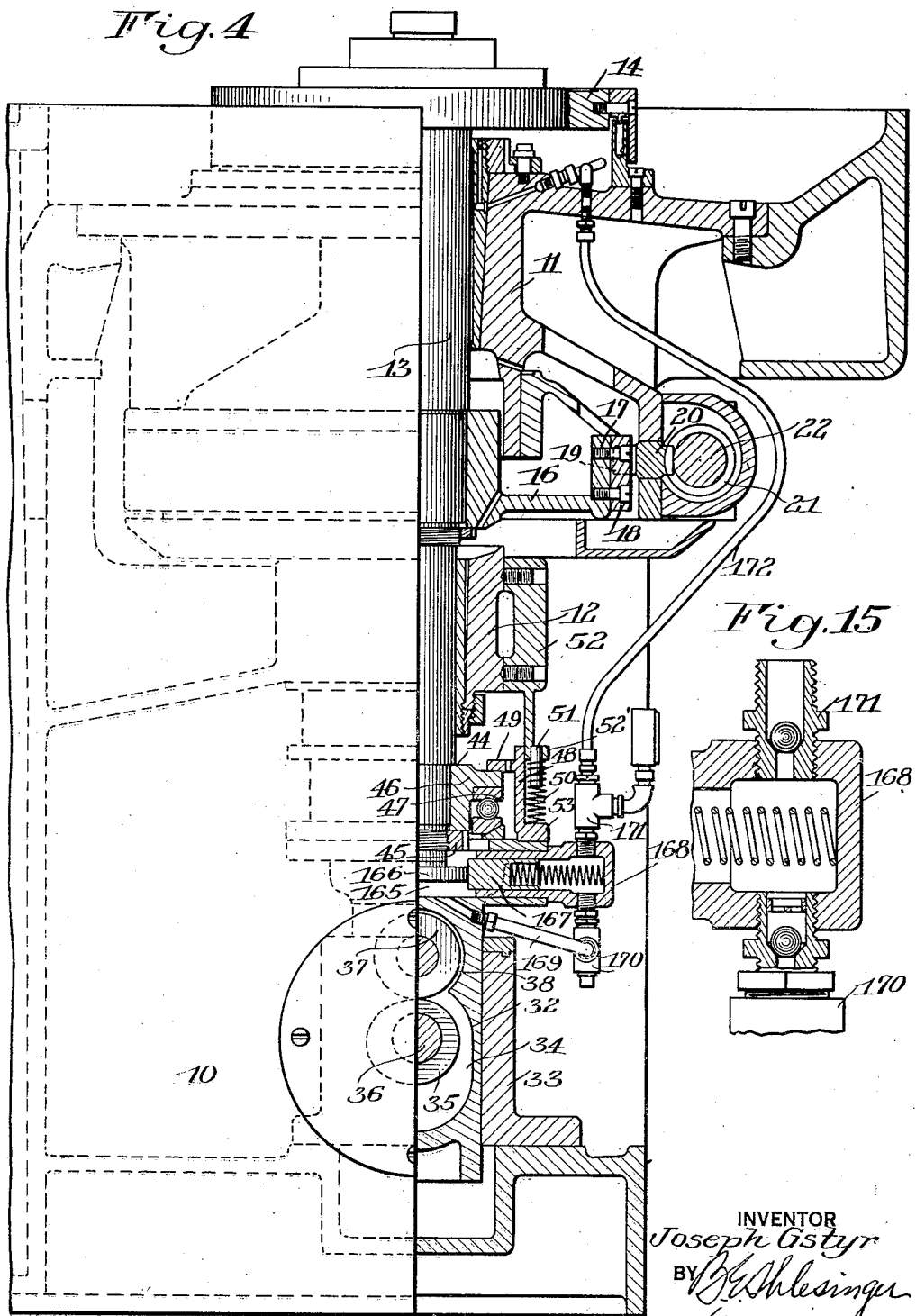
Fig. 4 is a side elevation, partly in section, of the work head support.

Through the mechanism just described, it will be seen that the cam 35 will be continuously rotated, thereby to impart a reciprocatory movement to the work spindle 13. The contour of the cam 35 will be such, as is shown in Fig. 4, as to impart a slow upward movement to the work spindle and the cutter head carried thereby, and to permit a quick return, or in other words, the cutter head is given a relatively slow upward motion during grinding to give each blade the desired relief and a quick return movement to quickly position the blade next to be ground for the succeeding grinding operation.

Three grinding members are preferably provided, formed of emery, carborundum or similar suitable substance, one operating upon each side face of the cutter blades, and the other upon the end face thereof. In the machine illustrated, the grinding member 54 operates upon the outer side surface 55 of the blades, the grinding member 56 upon the inner side surfaces 57 thereof and the grinding member 58 upon the end surfaces 59 thereof. Each of the grinding wheels 54, 56, and 58 are mounted directly upon the armature shaft of a motor, of which three are provided, which are housed in the housings 60, 61 and 62. The motors may be hooked up together so as to operate the grinding wheels simultaneously or may be so arranged as to be controlled separately. These motors will impart to the grinding wheels the required rotary motion which combined with the rotation of the cutter head and its reciprocation will produce the desired relief upon the sides and ends of the cutter blades. The grinding wheel 58, which may be made much smaller than the other grinding wheels, as shown, can be positioned in operative relation to the cutter blades by swinging the housing 62, in which is mounted this grinding wheel and its motor, about the bracket arm 65 which is secured to the frame 10 of the machine. Preferably this grinding wheel will be mounted on the bracket 65 for universal adjustment so as to permit positioning of the wheel at any desired height above the cutter blades and at any desired distance from and either side of the axis of the work spindle, to enable grinding blades which are secured to cutter heads of different diameters.

Each of the grinding members 54 and 56 are mounted for lateral, vertical and angular adjustment with reference to the cutter head. The mountings of these grinding members 54 and 56 are identical, so that only one mounting need be described here. Each of the housings 60 and 61 are vertically adjustable on ways formed on a member 67 which is provided with a lateral extension 68 in which is journaled a shaft 69 to which is keyed a worm 70 which meshes with a worm wheel segment 71 which is secured to a slide 72. Each of the members 67 is also provided with a rearward projection or lug 73 which seats in a socket formed in the slide 72. The worm wheel segment 71 is formed concentric with this lug 73 and it is about the axis of this lug that the angular adjustment of the member 67 and the grinding wheel carried thereby takes place. The slides 72 are each laterally adjustable upon an upright member 74 secured to or formed integral with the frame 10 of the machine. The slides 72 may each be adjusted on this upright by screws 75 which are in threaded engagement with each of the slides. To each of the screws 75 is fastened a ratchet wheel 76 (Figs. 12 and 13) which is provided with fine clutch teeth 79 upon its outer face which are adapted to be engaged with the clutch teeth 80 formed on the inner face of the handwheel 81. The handwheels 81 are operatively engaged with their respective screws 75 by threading the small handwheels 82 on the pins 83 which are threaded into sockets formed in the outer ends of each of the screws. The threading up of the small handwheel 82 on its pin 83 will force the clutch teeth 80 of the large handwheel 81 into engagement with the clutch teeth 79 of the ratchet wheel 76 which is secured to the screw 75, whereby rotation of each hand wheel 81 will be transmitted to its screw 75 to laterally adjust the respective slides 72 on the upright 74.

By the means just described, it will be seen that the grinding wheels 54 and 56 may be adjusted so as to position them in any desired relation to the cutter blades to be relieved. Preferably, the grinding members are arranged in the angular relation shown, the grinding wheel 58 being located with its grinding edge parallel to the outer end of the blade to be ground, and the grinding wheels 54 and 56 being located at angles corresponding to the angles of the outside and inside surfaces of the blades. In the operation of the machine, the several grinding members are rotated continuously and at the same time a combined rotary and reciprocatory movement is imparted to the cutter blades by the means already described, so that the blades are properly relieved.

One feature of the present invention is the provision of means whereby the grinding members may be automatically and periodically fed relative to the cutter blades to take up for wear on the grinding members and of means whereby the grinding members may be periodically and automatically dressed.

The means for periodically feeding the grinding members toward the cutter blades will first be described. In the machine illustrated, provision is made for an automatic feed of the grinding members 54 and 56 only. The grinding member 58 may be adjusted from time to time by hand if desired to compensate for wear on this member. It will be understood, however, that the mechanism employed for feeding the wheels 54 and 56 is applicable with suitable modifications to the feeding of the wheel 58 if it be deemed desirable to make the feed of this wheel automatic also. Secured to the screws 75, as already described, are ratchet wheels 76. These ratchet wheels are adapted to be moved periodically to impart a periodic movement to the screws 75, thereby to move the slides 72 to carry the grinding wheels 54 and 56 toward the cutter blades. For operating the ratchet wheels, in each case, a pawl 85 is provided which is mounted on a stud 86 carried by an oscillatable pawl carrier 87. Each of the pawl carriers 85 is provided with a projection or lug 88 which is seated in a socket 89 formed in the outer end of a piston 90 which is adapted to reciprocate in a cylinder 91. The cylinders 91 are each provided with ducts or ports for the admission of fluid pressure alternately to the opposite ends of the piston. The mechanism for controlling the admission of fluid pressure to the cylinders 91 will be described presently. It will be seen, however, that on each reciprocation of the piston 90, a pawl carrier 87 will be oscillated to move its ratchet wheel 76 and screw 75 to feed a grinding wheel toward the cutter blades. The amount of feed of the grinding wheel at each oscillation of the pawl carried may be predetermined by adjusting the screw 92 carried by the frame 74 so as to limit the stroke of the piston 90. The member 78 which is formed integral with the handwheel 81 is provided with suitable graduations so that the ratchet wheel may be positioned initially to limit the total feed of the grinding member to any desired extent. This member 78 carries a deflector 95 which is adapted to be positioned, according to the graduations of the member 78, to throw the pawl 85 out of engagement with the ratchet wheel to stop further feed movement of the grinding member after that member has been fed in toward the cutter blade to the desired limit. The pawl is positively held in operative position by a spring pressed plunger 96 mounted in a socket in the pawl and engaging in a recess formed in the stud 86. When the pawl is swung out of operative position to permit of hand adjustment of the screw 75 and the slide 72, this plunger 96 cooperating with the slabbed off face 97 of the stud serves to securely hold the pawl out of engagement with the ratchet wheel.

For periodically dressing the grinding wheels 54 and 56 diamonds 98 or other suitable dressing elements may be provided. The grinding wheel 58 is preferably hand dressed by any suitable means, though, if desired, this wheel may be periodically and automatically dressed through mechanism such as is employed to dress the grinding members 54 and 56. The dressing members 98 provided for dressing the wheels 54 and 56 are in each case mounted on bars 99 which are movable in the bores of the dresser carriers 100. Each dresser carrier 100 is secured to a piston 101 which is reciprocable in a cylinder 102 which is provided with ports or ducts 103 for the admission of fluid pressure to the opposite ends of the piston. The mechanism for controlling the admission of fluid pressure to the cylinders 102 will be described presently. It will be seen however, that on each reciprocation of the pistons 101 the dressing elements 98 will be moved across the face of the grinding wheels 54 and 56 to dress the same.

To insure the steady movement of the dressers so necessary to secure the best results in dressing the wheels, the piston rods 101' will preferably each be made in two parts, the upper part of said piston rods being reciprocable in the cylinders 102 and the lower sections of said piston rods, which are preferably of larger diameter than the upper sections, being reciprocable in each case in an elongated guide member 104 one of which is secured to each of the housings 60 and 61. This elongated guide prevents any sidewise movement of the dressing elements and hence insures that the wheel be properly dressed.

A further feature of the present invention is the provision of mechanism for automatically and periodically feeding the dressing elements toward the wheels to be dressed to compensate for wear on the wheels. For the purpose of this feed movement the diamonds 98, as previously stated, are mounted on bars 99 which are movable in the bores of their respective carriers 100. Each of these rods 99 is screw-threaded adjacent its outer end and threads into a portion of the carrier 100. Secured to each of the rods 99 is a ratchet wheel 105. Each of the ratchet wheels 105 is moved periodically to advance its rod 99 to feed the diamond carried thereby toward the grinding wheel which it dresses. The ratchet wheels 105 are each actuated by pawls 106 pivotally mounted each on a pawl carrier 107 which is mounted coaxially with the ratchet wheels and which is periodically oscillated by movement of a piston 108, each pawl carrier 107 being provided with a lug or projection 107' engaged in a socket formed in the piston rod 108'. The pistons 108 are reciprocable in cylinders 109 which are provided with ducts or ports 110 through which fluid pressure is admitted to the opposite ends of the pistons. The mechanism for controlling the admission of fluid pressure to the cylinders 109 will be described presently. It will be seen, however, that on each reciprocation of the pistons 108 the respective ratchet wheels 105 will be moved to feed the respective diamonds 98 forward. The amount of this feed movement may be predetermined by setting the screws 112, one of which is threaded into a lug 113 formed on each of the carriers 100. These screws 112 serve to limit the stroke of the piston rods 108'. To prevent backward movement of the ratchet wheels 105, dogs 114 may be provided, one of which is mounted on each of the carriers 100. These dogs will preferably be connected one to each of the pawls 106 by a spring 115, so that the dogs and pawls may be engaged simultaneously with their respective ratchet wheels or disengaged simultaneously therefrom and held securely in either position. The diamonds may be adjusted by hand by moving the knurled nuts 116 one of which is secured to each of the rods 99.

Figure 9:
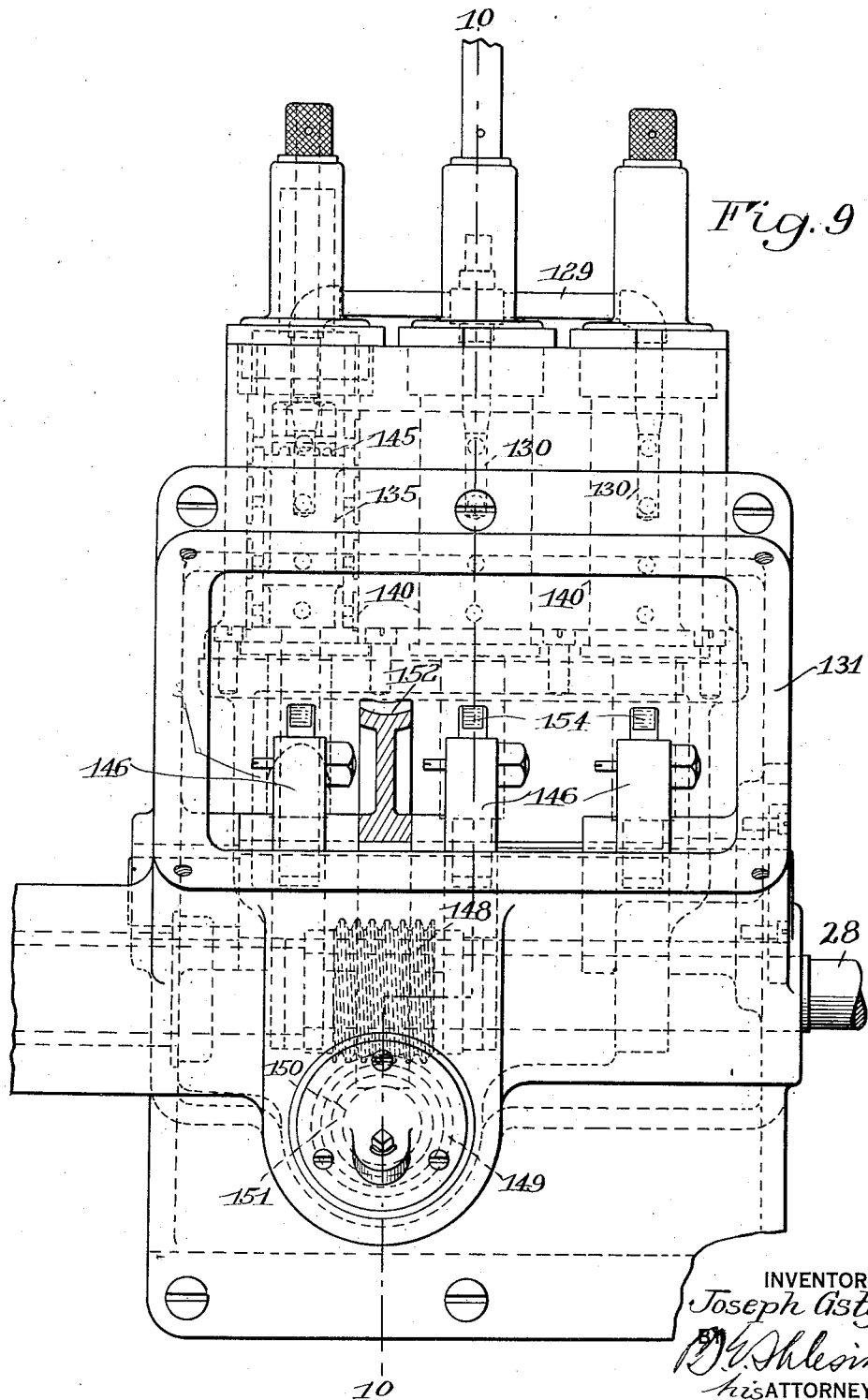
Fig. 9 is a rear elevation of the fluid pressure control box.

Each of the pistons 90, 101, and 108 is actuated preferably from the same source of power, the main drive shaft of the machine, and the mechanism for actuating these pistons is of identical structure. Formed in the frame or base 10 of the machine is a reservoir 120 which contains the fluid employed to operate the various fluid pressure control devices already described. The fluid is pumped from this reservoir 120 through the pipe 121 (Fig. 2) by means of a pump 123 (Fig. 5) which may be of any suitable structure and which preferably will be driven from the drive shaft 28 by the spur gears 124. The pump forces the fluid through the pipe 125 (Fig. 2) to the pipe 126. A safety valve 127 is provided in this pipe 126 to prevent damage due to excess pressure and a return pipe 128 is connected with this safety valve leading back to the reservoir 120. The pipe 126 is connected with a three-way distributor 129 (Fig 9) which conducts the fluid to the intake pipes 130 (Figs. 9 and 10) which lead into the control box 131. To keep the pressure in the system above the working minimum a pressure cylinder 132 (Fig. 2) may be provided which is connected to the pipe 126 by the pipe 133.

Three valves are mounted in the control box 131 for controlling, respectively, the feed movement of the grinding wheels through the pistons 90, the dressing movement of the diamonds 98 through the pistons 101, and the feed movement of the diamonds through the pistons 108. These valves 135 are of identical structure and are controlled in each case by rotors 146 which are of identical structure, so that a description of the structure of one of the valves and of one of the rotors only will be necessary.

The fluid flows into the control box through the intake pipes 130 and is distributed by the valves 135 to either side of the pistons controlled by said valves 135 through the pipes 136 and 137 leading from said control box and is exhausted from said box through the pipes 138 which lead back to the reservoir 120. Each of the pipes 130, 136, 137 and 138 is connected through suitable ducts with the chambers in which the valves 135 are mounted. Secured in each of these chambers 140 is a member 141 which is provided with a plurality of apertures registering with the ducts connecting the chamber with the pipes 130, 136, 137 and 138. The valve 135 proper slides in this member. The valve is connected to a rod 142 which is reciprocable in the chamber and the valve is so constructed that it permits flow of the fluid between two of the pipes 130, 136, 137 and 138 at one time only. Secured to the rod 142 above the valve is a cap 145 which is provided with a plurality of notches or apertures which permit the fluid to flow down inside the valve 135 between its inner wall and the rod 142.

The valves 135 are each actuated by rotors 146. These rotors are of identical structure and are keyed to a shaft 147 which is suitably journaled in the control box and which is driven from the main drive shaft 28 through a worm 148 keyed to said shaft, a worm wheel 149 keyed to a shaft 150, suitably journaled in the control box, a worm 151 fastened to said shaft 150, and a worm wheel 152 keyed to the shaft 147. Each rotor 146 is provided with a plurality of radial slots 153 in which are adjustable the fingers 154. As shown the fingers 154 are connected with the rotor through a pin and slot connection. When the fingers are in their outer position they will engage the bottom of the rods 142 as the rotor rotates on its axis. By varying the number of fingers in engaging position, then, the frequency of reciprocation of the rod 142 may be varied to vary the frequency of movement of the valves 135 and of the pistons controlled thereby.

In the position shown in Fig. 10 the fluid will flow through the intake 130 and the apertures of the member 141 registering therewith out through the pipe 137 to one side of the pistons controlled by said valve. The fluid previously admitted to the other side of said pistons will be forced back through the pipe 136 and the notches or apertures 134 down between the rod 142 and the valve 135 to the exhaust pipe 138 through which it will return to the reservoir. When the valve 135 and the rod 142 have reached the position shown in Fig. 11 the fluid forced through the pipe 130 will be admitted to the other side of the pistons controlled by the valve 135 through the pipe 131, while the fluid will be exhausted from the opposite sides of said pistons through the pipe 137 and the exhaust pipe 138. From the mechanism just described, it will be seen that periodically fluid pressure will be admitted to the opposite sides of the various pistons 90, 101, and 108 to periodically reciprocate said pinions and actuate the mechanism controlled thereby. The feed movement of the dressers, the feed movement of the grinders, and the dressing of said grinders, hence, will be fully automatic and in timed relation with the relieving motion imparted to the cutter head support.

A spring 155 may be interposed between each of the rods 142 and the caps 156 secured to the chambers 140 to return the valves 135 to their lower position upon the completion of the upstroke. Each valve will control two pistons. Thus one valve will control the two pistons 90 which actuate the slides 72, one valve will control the two pistons 101 which actuate the dressing elements 98, and one valve will control the two pistons 108 which actuate the rods 99 to which the dressing elements are secured. Each of the pipes 136 and 137, therefore, will divide exteriorly of the control box to distribute fluid to two corresponding ends of two pistons.

It may be desirable at times to hand dress the grinding wheels 54 and 56. For this purpose a hand lever 160 (Fig. 2) may be provided for manually reciprocating the rod 142 which controls the distribution of fluid pressure to the cylinders 102.

If desired, a check valve 161 (Fig. 8) may be secured in the intake opening of these cylinders 102. By setting this check valve the flow of fluid into the cylinders 102 can be controlled to control the speed of movement of the dressing element 98 across the grinding wheel and hence to control the fineness of the dressing.

One feature of the machine illustrated, is the mechanism for lubricating the work spindle 13. This mechanism is shown in Fig. 4. The member 32 is hollowed out at its upper end to form a chamber or reservoir 165 adapted to contain a suitable lubricating fluid. Secured to the lower end of the spindle 13 is a cam 166 which rotates in this reservoir and which actuates a spring pressed plunger 167 which is housed in a sleeve 168 which is secured to the member 32. The reservoir 165 is connected with this sleeve or chamber 168 by a pipe 169 and a valve 170. The oil is pumped from the sleeve or chamber 168 by the plunger 167 through the valve 171 and the pipe 172. The pipe 172 conducts the oil to the upper portion of the spindle 13 whence it flows back over the various bearings to the reservoir 165 to be used again. The system is wholly enclosed and provides a simple and practical mechanism for lubricating the work-head support parts. The valves 170 and 171 are of identical structure and the mechanism just described will work regardless of how the sleeve 168 is positioned in the member 32.

In setting up the machine the various grinding wheels will be adjusted into operative position, as already described. When the motor 26 is started up the cutter head will be simultaneously rotated and reciprocated. Simultaneously the grinding wheels will be continuously rotated by their respective motors. The grinding wheels 54 and 56 will be periodically dressed and periodically fed relative to the cutter head. The frequency of these dressing and feeding movements may be varied at will by a suitable selection of gearing and by adjustment of the fingers of the rotor 146. The work head support 14 may be of stepped construction as shown in Fig. 4 to permit proper positioning of various diameter cutter heads. By properly selecting the change gears 39 and setting the speed gears 29 the speed of rotation of the cutter head support 14 and of reciprocation of the spindle 13 may be varied to suit the size of cutter head to be relieved and any variations in the number of blades carried by such cutter head.

The inside cutter grinder 56 has to be lifted away from the cutter blades to permit removal of the cutter head from its support 14 after the blades have been ground. To assist in the manual movement of this grinder and its housing 61 a counterweight 180 may be employed. Preferably, however, I utilize fluid pressure to move this grinding wheel and its housing. For this purpose, the housing 61 is secured to a cylinder 181 in which is housed the piston 182. Fluid pressure is admitted to opposite sides of this piston to move the cylinder and housing in opposite directions, by means of a pair of pipes 183 and 184, which are mounted one within the other. These pipes may be secured to the piston in any suitable manner. The pipe 183 passes through the piston and its end is open, so that fluid flowing through this pipe operates against the upper side of the piston. The pipe 184 is provided with openings 185 intermediate its length and on the side of the piston opposite to that to which fluid pressure is directed by the pipe 183. The fluid may be taken from the pipe 126 through a pipe 186 which leads into a four-way valve 187 connected by a pipe 188 (Fig. 2) with the pipe 184, by a pipe 189 with the pipe 183, and by a pipe 190 with the reservoir 120. The valve 187 may be manually operated. By the mechanism just described, the grinding wheel 56 can be lifted out of and moved into operating position.

The present invention provides a machine which is simple and accurate in operation. By periodically dressing the grinding wheel it can always be kept in suitable condition to properly finish the cutter blades. By periodically feeding the grinding wheel toward the cutter support, the wear of the grinding wheel will be compensated for, so that all blades relieved on a machine constructed according to this invention will be ground back or relieved to the necessary extent. The periodic feeding of the dresser also assists in insuring accurate relief of the cutter blades or other articles ground, because it always keeps the dresser in the desired contact with the grinding wheel. By making the means which control these various operations fluid pressure actuated, the complicated and expensive machinery which would otherwise be necessary is avoided.

While I have described my invention in connection with a specific embodiment in connection with a specific use, it will be understood that this invention is capable of various further modifications and uses without departing from the intent of the invention and that this application is intended to cover any adaptations or embodiments, following in general, the principles of the invention and including such departures from the present disclosure as come within known or customary practise in the gear art and may be applied to the essential features hereinbefore set forth and as fall within the scope of the invention or the limits of the appended claims.

Having thus described my invention, what I claim is:

1. In a grinding machine, a work support, a grinding member, means for producing a relative movement between the grinding member and the work support to effect the grinding operation, fluid-pressure operated means for dressing the grinding member, fluid pressure operated means for feeding said dressing means relative to said grinding member, and means controlling the operation of each of said fluid-pressure operated means to actuate each periodically at predetermined intervals in the operation of the machine.

2. In a grinding machine, a work support, a grinding member, means for periodically feeding the grinding member relative to the work support, means for periodically dressing the grinding member and means for periodically feeding the dressing means relative to the grinding member, each of said three last named means being fluid pressure operated and adjustable means for controlling the timed relation of the operation of said fluid pressure operated means relatively to each other and to the grinding operation.

3. In a grinding machine, the combination with a grinding member and work support and means for producing a relative movement between the grinding member and the work support to grind the work, of means for dressing said grinding member comprising a dressing element, a cylinder, a piston to which said dressing element is connected, reciprocable in said cylinder, a valve for controlling the admission of fluid pressure alternately to opposite ends of said piston and means actuated in predetermined time relation with the relative movement between the grinding member and the work for actuating said valve whereby the grinding wheel is dressed periodically in timed relation with the grinding operation.

4. In a grinding machine, the combination with a grinding member, a work support and means for producing a relative movement between the grinding member and the work support to grind the work, of means for dressing said grinding member comprising a dressing element, a cylinder, a piston to which said dressing element is connected, reciprocable in said cylinder, a valve for controlling the admission of fluid pressure alternately to opposite ends of the piston, a rotary member having a plurality of spaced fingers each adjustable into position to engage said valve on rotation of said member to actuate said valve, and means for rotating said member in predetermined timed relation with the operation of the means for producing the relative movement between the grinding member and the work support whereby said valve is actuated at predetermined intervals in the grinding operation.

5. In a grinding machine, a work support, a grinding member, means for producing relative movement between the grinding member and the work support to grind the work, means for dressing the grinding member in timed relation with the grinding operation periodically at predetermined intervals in the operation of the machine and fluid-pressure operated means for feeding said dressing means relative to the grinding member actuated periodically at predetermined intervals in the operation of the machine in timed relation with both the grinding and dressing operations.

6. In a grinding machine, a work support, a grinding member, means for producing relative movement between the grinding member and the work support to grind the work, fluid-pressure operated means for dressing the grinding member periodically at predetermined intervals in the operation of the machine and means for feeding said dressing means relative to the grinding member actuated periodically at predetermined intervals in the operation of the machine in timed relation with both the grinding and dressing operations.

7. In a grinding machine, a rotary cutter blade support, a plurality of grinding members engaging the sides of said blades, means for imparting between the cutter blade support and said grinding members a relative relieving motion during the grinding operation in the direction of the axis of the cutter blade support, and means for periodically and simultaneously advancing each of said grinding members relative to said cutter blades to compensate for the wear of said grinding members.

8. In a grinding machine, a rotary cutter blade support, a plurality of grinding members engaging the sides of said blades, means for imparting between the cutter blade support and said grinding members a relative relieving motion during the grinding operation in the direction of the axis of the cutter blade support, and means for periodically and in timed relation with the relieving motion advancing each of said grinding members relatively to said cutter blades to compensate for the wear of said grinding members.

9. In a grinding machine, a cutter blade support, a plurality of grinding members engaging the sides of said blades, means for imparting between the cutter blade support and said grinding members a relative relieving motion during the grinding operation, means for dressing each of said grinding members and means for periodically and in timed relation with said relieving motion actuating each of said dressing means.

10. In a grinding machine, a rotary cutter blade support, a rotary grinding member, means for actuating the grinding member, means for rotating the cutter blade support, means for imparting a relative relieving movement between the cutter blade support and grinding member in the direction of the axis of the cutter blade support, a dressing element, means for imparting in timed relation with said relieving movement a periodic dressing movement to said dressing element to dress the grinding wheel at predetermined intervals, and means for imparting in timed relation with said dressing movement a periodic relative feeding movement of the grinding member and cutter blade support relative to each other.

11. In a grinding machine, a rotary cutter blade support, a rotary grinding member, means for imparting a relative relieving movement between said cutter blade support and grinding member during the grinding operation in the direction of the axis of the cutter blade support, a dressing element, means for imparting in timed relation with said relieving motion a periodic movement to said dressing element to dress the grinding member at predetermined intervals in the operation of the machine and a periodic feed movement of said dressing element toward said grinding member and means for imparting in timed relation with both last named movements, a periodic relative feeding movement of the grinding member relative to the cutter blade support.

12. In a grinding machine, a cutter blade support, a rotary grinding member, means for imparting a relative relieving movement between the cutter blade support and grinding member during the grinding operation, fluid pressure operated means for periodically feeding the grinding member and cutter blade support relatively to each other to compensate for the wear of the grinding member, a dressing device, fluid pressure operated means for periodically actuating the dressing device to dress the grinding member and means for adjustably timing the operations of said fluid pressure operated means relatively to each other and to said relieving movement.

13. In a grinding machine, a cutter blade support, a rotary grinding member, means for imparting a relative relieving movement between the cutter blade support and grinding member during the grinding operation, fluid pressure operated means for periodically feeding the grinding member and cutter blade support relatively to each other to compensate for the wear of the grinding member, a dressing device fluid pressure operated means for periodically actuating the dressing device to dress the grinding member and fluid pressure operated means for feeding the dressing device toward the grinding member and means for adjustably timing the operations of said fluid pressure operated means relatively to each other and to said relieving movement.

14. In a grinding machine, a rotary cutter blade support, a plurality of grinding wheels adapted to engage the end and both sides of the blades carried by said support, means for rotating the grinding wheels continuously, means for rotating the cutter blade support continuously and means for reciprocating said cutter blade support in the direction of its axis toward and from the grinding wheels a predetermined number of times during a single rotation of said cutter blade support.

15. In a grinding machine, a rotary cutter blade support, a rotary grinding member, means for rotating the grinding member continuously, means for rotating the cutter blade support continuously, and means for reciprocating said cutter blade support, in the direction of its axis in timed relation with the rotation of said support to relieve the blades carried by said support, and means for periodically and in timed relation with said last named movement imparting a relative feed movement between the cutter blade support and the grinding member to compensate for the wear of said grinding member.

16. In a grinding machine, a rotary cutter blade support, a rotary grinding member, means for rotating the grinding member continuously, means for rotating the cutter blade support continuously, means for imparting relieving movements to the cutter blade support in the direction of its axis during the grinding operation and means for periodically and in timed relation with said last named movements imparting a feed movement to said grinding member toward the cutter blade to compensate for wear of said grinding member.

17. In a grinding machine, a rotary cutter blade support, a rotary grinding member, means for rotating the grinding member continuously, means for rotating the cutter blade support continuously, means for imparting relative relieving movements between the cutter blade support and grinding member in the direction of the axis of said cutter blade support during the grinding operation, and means for periodically and in timed relation with said last named motion dressing said grinding member while in grinding position.

18. In a grinding machine, a rotary cutter blade support, a rotary grinding member, means for rotating the grinding member continuously, means for rotating the cutter blade support continuously, means for imparting relative relieving movements between the cutter blade support and grinding wheel in the direction of the axis of said cutter blade support, during the grinding operation, and means for dressing said grinding member while in grinding position.

19. In a grinding machine, a rotary cutter blade support, a rotary grinding member, means for rotating the grinding member continuously, means for rotating the cutter blade support continuously, means for imparting relative relieving movements between the cutter blade support and grinding member in the direction of the axis of the cutter blade support during the grinding operation, and fluid pressure operated means for periodically and in timed relation with said last named motion dressing said grinding member while in grinding position.

20. In a grinding machine, a rotary cutter blade support, a rotary grinding member, means for rotating the grinding member continuously, means for rotating the cutter blade support continuously, means for imparting relative relieving movements between the cutter blade support and the grinding wheel, in the direction of the axis of the cutter blade support during the grinding operation, means for periodically and in timed relation with said last named motion dressing said grinding member while in grinding position, and means for periodically and in timed relation imparting a relative feed movement between the cutter blade support and grinding member to compensate for wear of said grinding member.

21. In a grinding machine, a rotary cutter blade support, a rotary grinding member, means for rotating the grinding member continuously, means for rotating the cutter blade support continuously, means for imparting relative relieving movements between the cutter blade support and grinding member, in the direction of the axis of the cutter blade support during the grinding operation to relieve the cutter blades, means for periodically and in timed relation with said relieving motion dressing said grinding member while in operative position, means for periodically and in timed relation with said relieving motion imparting a relative feed movement between the cutter blade support and grinding member to compensate for wear of said grinding member, and means for periodically advancing the dressing element toward said grinding member to compensate for the wear of said grinding member.

22. In a grinding machine, a rotary cutter blade support, a rotary grinding member, a slide, upon which said member is mounted, movable in a direction perpendicular to the axis of said cutter blade support, means for rotating the grinding member, means for rotating the cutter blade support, means for imparting relative relieving movements between the cutter blade support and grinding member, in the direction of the axis of the cutter blade support at regular intervals during the grinding operation, and means for periodically moving said slide to compensate for the wear of said grinding member.

23. In a grinding machine, a rotary cutter blade support, a rotary grinding member, a slide upon which said grinding member is mounted, a diamond dresser mounted on said slide in operative relation to said grinding member, means for continuously rotating the grinding member, means for continuously rotating the cutter blade support, means for imparting relative relieving movements between the cutter blade support and grinding wheel, in the direction of the axis of the cutter blade support, at regular intervals during the grinding operation, means for periodically actuating said dresser to dress the grinding wheel while in grinding position, and means for periodically moving said slide to compensate for wear of said grinding wheel.

24. In a grinding machine, a rotary cutter blade support, a rotary grinding member, a slide upon which the grinding member is mounted, a dressing device mounted on said slide in operative relation to said grinding wheel, means for continuously rotating the grinding member, means for continuously rotating the cutter blade support, means for imparting relative relieving movements between the cutter blade support and grinding wheel in the direction of the axis of said cutter blade support, during the grinding operation, means for periodically actuating said dressing device to dress the grinding wheel while in grinding position, means for periodically moving said slide to compensate for the wear of said grinding wheel, and means for periodically advancing said dresser toward the grinding wheel to maintain the dressing device in operative relation to said grinding wheel.

25. In a grinding machine, a rotary cutter blade support, a rotary grinding member, means for rotating the grinding member, means for continuously rotating the cutter blade support, means for imparting relative relieving movements between the cutter blade support and grinding member, in the direction of the axis of the cutter blade support, during the grinding operation to relieve the cutter blades, means for dressing the grinding member, and fluid pressure operated means for periodically and in timed relation with said relieving movements actuating said dressing means.

26. In a grinding machine, a rotary cutter blade support, a rotary grinding member, means for rotating the grinding member continuously, means for rotating the cutter blade support continuously, means for imparting relative relieving movements between the cutter blade support and grinding member, in the direction of the axis of the cutter blade support, during the grinding operation, a slide on which the grinding member is mounted, movable in a direction perpendicular to the axis of the cutter blade support, fluid pressure operated means for periodically dressing said grinding member, fluid pressure operated means for periodically moving said slide to compensate for the wear of the grinding member and means for timing the operation of said fluid pressure operated means relatively to each other and to said relieving movement.

27. In a grinding machine, a rotary cutter blade support, a rotary grinding member, means for rotating the grinding member continuously, means for rotating the cutter blade support continuously, means for imparting relative relieving movements between the cutter blade support and grinding member, in the direction of the axis of the cutter blade support, during the grinding operation, a slide on which the grinding member is mounted movable in a direction perpendicular to the axis of the cutter blade support, fluid pressure operated means for imparting a step by step movement periodically to said slide, a diamond for dressing the grinding member, fluid pressure operated means for periodically moving the diamond across the grinding member, and fluid pressure operated means for periodically advancing said diamond toward the grinding member to maintain it in operative relation to said grinding member, and means for timing the operation of said fluid pressure operated means relatively to each other and to said relieving movements.

28. In a grinding machine, a rotary cutter blade support, a slide, a rotary grinding member adjustably mounted on said slide, means for rotating the grinding member continuously, a main drive shaft, means operated from said shaft for continuously rotating the cutter blade support, means operated from said shaft for imparting relative relieving movements between the cutter blade support and grinding member, in the direction of the axis of the cutter blade support, to relieve the cutter blades, a diamond for dressing the grinding member, means operated from said shaft for periodically reciprocating said diamond to dress the grinding member and means operated from said shaft for periodically moving said slide to compensate for the wear of said grinding wheel.

29. In a grinding machine, a rotary cutter blade support, a slide, a rotary grinding wheel adjustably mounted on said slide, means for rotating the grinding wheel, means for rotating the cutter blade support continuously, means for imparting relative relieving movements between the grinding wheel and cutter blade support, in the direction of the axis of the cutter blade support, a predetermined number of times in each rotation of the cutter blade support to relieve the cutter blades, a diamond for dressing the grinding wheel while in operative position, fluid pressure operated means for periodically reciprocating the diamond across the grinding wheel, fluid pressure operated means for imparting a step by step feed movement to said slide to compensate for the wear of the grinding wheel, a shaft driven in timed relation to said relieving motion, and control devices on said shaft governing the frequency of said feed and dressing movements.

30. In a grinding machine, a rotary cutter blade support, a slide, a rotary grinding wheel adjustably mounted on said slide, means for rotating the grinding wheel, means for rotating the cutter blade support continuously, means for imparting relative relieving movements between the grinding wheel and cutter blade support, in the direction of the axis of the cutter blade support, a predetermined number of times in each rotation of the cutter blade support to relieve the cutter blades, a diamond for dressing the grinding wheel while in operative position, fluid pressure operated means for periodically reciprocating the diamond across the grinding wheel, fluid pressure operated means for imparting a step by step feed movement to said slide to compensate for the wear of the grinding wheels, fluid pressure operated means for periodically advancing said diamond toward the grinding wheel to maintain the diamond in operative relation with said grinding wheel, a shaft driven in timed relation to said relieving motion, and control devices on said shaft governing the frequency of said feed and dressing movements.

31. In a grinding machine, a rotary cutter blade support, a rotary grinding member, means for rotating the grinding member continuously, means for rotating the cutter blade support continuously, means for imparting relative relieving movements between the grinding member and cutter blade support in the direction of the axis of the cutter blade support a predetermined number of times in each rotation of the cutter blade support to relieve the cutter blades, and means operable on the periphery of the grinding member at a point removed from its point of engagement with the cutter blade for dressing said grinding member while in grinding position.

32. In a grinding machine, a rotary cutter blade support, a rotary grinding member, means for rotating the grinding member continuously, means for rotating the cutter blade support continuously, means for imparting relative relieving movements between the grinding member and cutter blade support, in the direction of the axis of the cutter blade support, a predetermined number of times for each rotation of the cutter blade support to relieve the cutter blades, a diamond positioned to engage said grinding member at a point removed from its point of engagement with the cutter blades and means for periodically and in timed relation with the relieving movement, moving said diamond across the grinding member to dress the same.

33. In a grinding machine, a rotary cutter blade support, a rotary grinding wheel, means for rotating the grinding wheel continuously, means for rotating the cutter blade support continuously, means for imparting relative relieving movements between the grinding wheel and cutter blade support, in the direction of the axis of the latter, a predetermined number of times for each rotation of the cutter blade support to relieve the cutter blade, a dressing device operable on the periphery of the grinding wheel at a point removed from its point of engagement with the cutter blade for dressing said grinding wheel while in operative position and fluid pressure operated means for periodically actuating said dressing device in timed relation with the relieving movements.

34. In a grinding machine, a work support, a grinding member, means for actuating said grinding member, and means operable on the periphery of the grinding member at a point removed from the point of its engagement with the work for dressing said grinding member periodically at predetermined intervals in the operation of the machine and while grinding.

35. In a grinding machine, a work support, a grinding wheel, means for actuating the grinding wheel, a dressing device positioned to engage said wheel at a point removed from the point of its engagement with the work, a piston on which said dressing device is mounted and fluid pressure actuated means for reciprocating said piston periodically at predetermined intervals in the operation of the machine to dress the grinding wheel while in grinding position.

36. In a grinding machine, a work support, a grinding wheel, means for actuating the grinding wheel, a slide, a support for said grinding wheel adjustably mounted on said slide, a dressing device secured to said last named support to engage the grinding wheel at a point removed from its point of engagement with the work, means for actuating said dressing device periodically at predetermined intervals in the operation of the machine to dress the grinding wheel while in grinding position and means for moving said slide toward the work periodically at predetermined intervals in the operation of the machine to compensate for the wear of said grinding wheel.

37. In a grinding machine, a work support, a grinding wheel, means for actuating the grinding wheel, a slide, a support for said grinding wheel adjustably mounted on the slide, a dressing device secured to said last named support to engage the grinding wheel at the point removed from its point of engagement with the work and while in grinding position, means for periodically actuating said dressing device, means for periodically moving said slide toward the works to compensate for the wear of said grinding wheel, and means for periodically advancing said dressing device toward said grinding wheel independently of the movement of said slide whereby to maintain the dressing device in operative relation to said wheel, each of said operations being in timed relation to each other and the grinding operation.

38. In a machine for relieving cutter blades, a work support, a slide, a grinding wheel mounted on the slide and angularly adjustable thereon to position said wheel so that its operating surface is inclined at an angle corresponding to the angle of the cutter blades to be ground, means for imparting a relative relieving movement between the work and grinding wheel in the direction of the axis of the work and means for imparting a step by step feed movement to said slide in a direction perpendicular to the axis of the work.

39. In a machine for relieving cutter blades, a work support, a slide, a grinding wheel mounted on said slide and angularly adjustable thereon to position said wheel so that its operating surface is inclined at an angle corresponding to the angle of the cutter blades to be ground, means for imparting a relative relieving movement between the work and grinding wheel in the direction of the axis of the work and fluid pressure operated mechanism for imparting a step by step feed movement to said slide in a direction perpendicular to the axis of the work.

40. In a machine for relieving cutter blades, a work support, a slide, a grinding wheel mounted on said slide and angularly adjustable thereon to position said wheel so that its operating surface is inclined at an angle corresponding to the angle of the cutter blades to be ground, means for imparting a relative relieving movement between the work and grinding wheel in the direction of the axis of the work, fluid pressure operated mechanism for imparting a step by step feed movement to said slide in a direction perpendicular to the axis of the work and means adjustable to govern the frequency of operation of said fluid pressure actuated mechanism.

41. In a grinding machine, a work support, a grinding wheel, fluid pressure operated mechanism for periodically dressing said grinding wheel while in grinding position, fluid pressure operated mechanism for periodically imparting a step by step relative feed movement between the grinding wheel and the work, fluid pressure operated mechanism for periodically feeding the dressing element relative to the grinding wheel to maintain said dressing element in operative relation to the grinding wheel, separate valve mechanisms for controlling each of said fluid pressure operated mechanisms, and separate means adjustable relatively to each other for governing the timed relation of the operation of said valve mechanisms.

42. In a grinding machine, a work support, a grinding wheel, fluid pressure operated mechanism for periodically dressing said grinding wheel while in grinding position, fluid pressure operated mechanism for periodically imparting a step by step relative feed movement between the grinding wheel and the work, fluid pressure operated mechanism for periodically feeding the dressing element relative to the grinding wheel to maintain the dressing element in operative relation to the grinding wheel, separate valve mechanisms for controlling each of said fluid pressure operated mechanisms, a rotatable member governing the operation of each of said valve mechanisms, each of said rotatable members being provided with a plurality of fingers adjustable at option into position to operate the valve mechanism on rotation of said members, whereby the frequency of operation of said valve mechanisms may be varied and their timed relation of operation relative to each other adjusted.

43. In a machine for relieving cutter blades, a work support, a grinding wheel, means for imparting a relative relieving movement between the work support and grinding wheel in the direction of the axis of the work, means for imparting a step by step relative feed movement between the work and grinding wheel, fluid pressure operated mechanism for actuating said feed means and means adjustable to govern the timed relation of the operation of the fluid pressure operated mechanism relative to the relieving movement.

44. In a machine for relieving cutter blades, a work support, a grinding wheel, means for imparting a relative relieving movement between the work support and grinding wheel, means for imparting a step by step relative feed movement between the work and grinding wheel, fluid pressure operated mechanism for actuating said feed means, valve mechanism for controlling the operation of said fluid pressure operated mechanism, and a rotatable member provided with a plurality of fingers adjustable at option into position to operate said valve mechanism on rotation of said member, whereby the frequency of operation of said valve mechanism and the timed relation of the feed movement to the relieving movement may be adjusted.

45. In a grinding machine, a work support, a grinding wheel, means for actuating the grinding wheel, fluid pressure operated mechanism for periodically dressing said grinding wheel at a point remote from the point of its engagement with the work and while in grinding position and means adjustable to govern the frequency of operation of said fluid pressure operated mechanism in the operation of the machine.

46. In a machine for relieving cutter blades, a work support, a grinding wheel, means for imparting a relative relieving movement between the work support and grinding wheel in the direction of the axis of the work, fluid pressure operated mechanism for periodically dressing said grinding wheel while in grinding position and means adjustable to govern the timed relation of said dressing operations relative to the relieving operations.

47. In a machine for relieving cutter blades, a work support, a grinding wheel, means for imparting a relative relieving movement between the work support and the grinding wheel, fluid pressure operated mechanism for periodically dressing said grinding wheel while in grinding position, valve mechanism for controlling the operation of said fluid pressure operated mechanism and a rotatable member driven in timed relation with the means for imparting the relieving movement, said member being provided with a plurality of fingers adjustable at option into position to operate said valve mechanism on rotation of said member, whereby the frequency of operation of said valve mechanism and the timed relation of the dressing to the relieving operations may be adjusted.

48. In a grinding machine, a work support, a grinding wheel, means for dressing the grinding wheel at a point remote from the point of its engagement with the work and while in grinding position periodically at predetermined intervals in the operation of the machine, fluid pressure operated mechanism for periodically feeding the dressing element relative to the grinding wheel to maintain the dressing element in operative relation to the grinding wheel, and means adjustable to govern the timed relation of operation of said feeding mechanism relative to the dressing movements.

49. In a grinding machine, a work support, a grinding wheel, means for actuating the grinding wheel, fluid pressure operated mechanism for dressing the grinding wheel at a point remote from the point of its engagement with the work and while in grinding position periodically at predetermined intervals in the operation of the machine, fluid pressure operated mechanism for periodically feeding the dressing element relative to the grinding wheel to maintain the dressing element in operative relation to the wheel, separate valve mechanisms for controlling each of said fluid pressure operated mechanisms, and separate means adjustable relatively to each other for governing the timed relation of operation of said valve mechanisms.

50. In a machine for relieving cutter blades, a work support, a grinding wheel, means for imparting relative relieving movements between the grinding wheel and work support, means for periodically dressing the grinding wheel while in grinding position, fluid pressure operated mechanism for periodically feeding the dressing element relative to the wheel to maintain the dressing element in operative relation to the grinding wheel, and means adjustable to govern the timed relation of operation of the feeding mechanism relative to the dressing and relieving movements.

51. In a machine for relieving cutter blades, a work support, a grinding wheel, means for imparting a relative relieving movement between the grinding wheel and work, means for dressing the grinding wheel periodically at predetermined intervals in the operation of the machine and while in grinding position, fluid pressure operated mechanism for periodically feeding the dressing element relative to the wheel to maintain said dressing element in operative relation to said wheel, a valve for controlling the operation of said fluid pressure operated mechanism and a rotatable member provided with a plurality of fingers adjustable at option into position to operate said valve on rotation of said member whereby the frequency of operation of said valve and the timed relation of the feed to the dressing movements may be adjusted.

52. In a machine for relieving cutter blades, a work support, a grinding wheel, means for imparting a relative relieving movement between the grinding wheel and the work, fluid pressure operated means for dressing the grinding wheel periodically at predetermined intervals in the operation of the machine and while in grinding position, fluid pressure operated mechanism for periodically feeding the dressing elements relative to the grinding wheel to maintain the dressing element in operative relation to said wheel, separate valves for controlling each of said fluid pressure operated mechanisms, and separate means adjustable relatively to each other for governing the timed relation of operation of said valves.

53. In a machine for relieving cutter blades, a work support, a grinding wheel, means for imparting a relative relieving movement between the grinding wheel and work, fluid pressure operated mechanism for dressing the grinding wheel periodically at predetermined intervals in the operation of the machine and while in grinding position, fluid pressure operated mechanism for periodically feeding the dressing element relative to the grinding wheel to maintain said dressing element in operative relation to said grinding wheel, separate valves for controlling each of said fluid pressure operated mechanisms, a rotatable member governing the operation of each of said valves, each of said rotatable members being provided with a plurality of fingers adjustable at option into position to operate said valves on rotation of said members, whereby the frequency of operation of said valves may be varied and their timed relation of operation to each other adjusted.

54. In a grinding machine, a work support, a grinding wheel, means for actuating the grinding wheel, means for imparting a step by step relative feed movement between said grinding wheel and the work, means for periodically dressing said grinding wheel while in grinding position, fluid pressure operated mechanism for periodically feeding the dressing element relative to the grinding wheel to maintain said dressing element in operative relation to said grinding wheel, and means adjustable to govern the timed relation of operation of said dresser feeding mechanism relative to the feeding and dressing operations.

55. In a grinding machine, a work support, a grinding wheel, means for actuating the grinding wheel, means for imparting a step by step relative feed movement between the grinding wheel and the work, means for periodically dressing the grinding wheel while in grinding position, fluid pressure operated mechanism for imparting a step by step feed movement to the dressing element to maintain the dressing element in operative relation to the grinding wheel, a valve for controlling the operation of said fluid pressure operated mechanism, and a rotatable member provided with a plurality of fingers adjustable at option into position to operate said valve on rotation of said member whereby the frequency of operation of said valve and the timed relation of the dresser feeding movement to the operations of the machine may be adjusted.

56. In a grinding machine, a work support, a grinding wheel, means for actuating the grinding wheel, means for imparting a step by step relative feed movement between the grinding wheel and the work, fluid pressure operated means for periodically dressing the grinding wheel while in grinding position, fluid pressure operated mechanism for periodically feeding the dressing element relative to the grinding wheel to maintain the dressing element in operative relation to the grinding wheel, separate valves for controlling each of said fluid pressure operated mechanisms, and separate means adjustable relatively to each other for governing the timed relation of operation of said valves.

57. In a grinding machine, a work support, a grinding wheel, means for actuating the grinding wheel, means for imparting a step by step relative feed movement between said grinding wheel and the work, fluid pressure operated mechanism for dressing the grinding wheel while in grinding position, fluid pressure operated mechanism for advancing the dressing element step by step relative to the grinding wheel to maintain the dressing element in operative relation to the grinding wheel, separate valves for controlling each of said fluid pressure operated mechanisms, a rotatable member governing the operation of each of said valves, each of said rotatable members being provided with a plurality of fingers adjustable at option into position to operate said valves on rotation of said members, whereby the frequency of operation of said valves may be varied and timed relatively to each other and to the grinding operations.

58. In a machine for relieving cutter blades, a work support, a grinding wheel, means for imparting a relative relieving movement between the work support and grinding wheel in the direction of the axis of the work, means for imparting a step by step feed movement between the work and grinding wheel in a direction perpendicular to the axis of the work, means for periodically dressing the grinding wheel while in operating position, fluid pressure operated mechanism for advancing the dressing element step by step relative to the grinding wheel to maintain the dressing element in operative relation to the grinding wheel, and means adjustable to govern the timed relation of operation of said fluid pressure operated mechanism relative to the other operations of the machine.

59. In a machine for relieving cutter blades, a work support, a grinding wheel, means for actuating said wheel, means for imparting a relative relieving movement between the grinding wheel and work, means for producing a step by step relative feed movement between the grinding wheel and work, means for periodically dressing the grinding wheel while in operating position, fluid pressure operated mechanism for imparting a step by step advance of said dressing element relative to the grinding wheel to maintain the dressing element in operative relation to the grinding wheel, a valve for controlling the operation of said fluid pressure operated mechanism, and a rotatable member provided with a plurality of fingers adjustable at option into position to operate said valve on rotation of said member whereby the frequency of operation of said valve and its timed relation to the other operations of the machine may be adjusted.

60. In a machine for relieving cutter blades, a work support, a grinding wheel, means for actuating said wheel, means for producing a relative relieving movement between the grinding wheel and work in the direction of the axis of the work, means for imparting a step by step relative feed movement between the grinding wheel and work in a direction perpendicular to the axis of the work, fluid pressure operated means for periodically dressing said grinding wheel while in operating position, fluid pressure operated mechanism for periodically advancing the dressing element relative to the grinding wheel to maintain said dressing element in operative relation with said grinding wheel, separate valves for controlling each of said fluid pressure operated mechanisms and separate means adjustable relatively to each other for governing the time relation of operation of said valves.

61. In a machine for relieving cutter blades, a work support, a grinding wheel, means for actuating said wheel, means for producing a relative relieving movement between the work support and grinding wheel in the direction of the axis of the work, means for producing a step by step feed movement of grinding wheel relative to the work in a direction perpendicular to the axis of the work, fluid pressure operated mechanism for periodically dressing the grinding wheel while in grinding position, fluid pressure operated mechanism for periodically feeding the dressing element relative to the grinding wheel to maintain the dressing element in operative relation to the grinding wheel, separate valves for controlling each of said fluid pressure operated mechanisms, a rotatable member governing the operation of each of said valves, a shaft on which said rotatable members are mounted, driven in timed relation with the means for producing the relieving operation, each being provided with a plurality of fingers adjustable at option into position to operate said valves on rotation of said members whereby the frequency of operation of said valves may be varied and the operation of said valves timed relatively to each other.

62. In a machine for relieving cutter blades, a work support, a grinding wheel, means for actuating said wheel, means for producing a relative relieving movement between the work support and grinding wheel, in the direction of the axis of the work, fluid pressure operated mechanism for producing a step by step relative feed movement between the grinding wheel and work support in a direction perpendicular to the axis of the work, fluid pressure operated mechanism for periodically dressing the grinding wheel while in grinding position, fluid pressure operated mechanism for periodically feeding the dressing element relative to the grinding wheel to maintain the dressing element in operative relation to the grinding wheel, separate valves for controlling each of said fluid pressure operated mechanisms, and separate means adjustable relatively to each other for governing the timed relation of operation of said valves.

63. In a machine for relieving cutter blades, a work support, a grinding wheel, means for actuating said wheel, means for imparting a relative relieving movement between the work support and grinding wheel in the direction of the axis of the work, fluid pressure operated mechanism for producing a step by step relative feed movement between the grinding wheel and the work in a direction perpendicular to the axis of the work, fluid pressure operated mechanism for periodically dressing the grinding wheel while in operating position, fluid pressure operated mechanism for periodically advancing the dressing element relative to the grinding wheel to maintain the dressing element in operative relation to the grinding wheel, separate valves for controlling each of said fluid pressure operated mechanisms, a rotatable member governing the operation of each of said valve mechanisms, said rotatable members being mounted upon the same shaft, each of said rotatable members being provided with a plurality of fingers adjustable at will into position to operate said valves on rotation of said members, whereby the frequency of operation of said valves may be varied and the operation of said valves timed relatively to each other and to the relieving movement.

64. In a machine for relieving cutter blades, a work support, a grinding wheel, means for producing a relative relieving movement between the work support and grinding wheel in the direction of the axis of the work, means for dressing the grinding wheel periodically while in grinding position, and means adjustable to control the frequency of said dressing movements.

65. In a machine for relieving cutter blades, a work support, a grinding member, means for producing a relative relieving movement between the work support and grinding member in the direction of the axis of the work, means for imparting a step by step feed movement between the work and the grinding member in a direction perpendicular to the axis of the work, means for dressing the grinding wheel periodically while in grinding position and means adjustable to determine the frequency of said dressing movements.

66. In a machine for relieving cutter blades, a work support, a grinding wheel, means for imparting a relieving movement between the work support and grinding wheel in the direction of the axis of the work, means for producing a step by step relative feed movement between the work support and grinding wheel in a direction perpendicular to the axis of the work, means for dressing the grinding wheel periodically while in operating position, and means adjustable to determine the frequency of said feeding and dressing movements.

67. In a grinding machine, the combination with a work support, a grinding member and means for operating said grinding member, of a dressing element, a support for the dressing element operable periodically at predetermined intervals in the operation of the machine to move the dressing element across the grinding member and means for actuating the same, a carrier on which the dressing element is mounted movable relative to said support to advance said dressing element toward the grinding member and means for moving said carrier at predetermined intervals in the operation of the machine to feed the dressing element relative to the grinding member to compensate for the wear of said member, including a ratchet wheel having an operative connection with said carrier, an oscillatable pawl carrier, a pawl mounted on said pawl carrier for operative engagement with said ratchet wheel and means for periodically oscillating said pawl carrier.

68. In a grinding machine, the combination with a work support, a grinding member, and means for operating said grinding member, of a dressing element, a carrier for said dressing element operable periodically at predetermined intervals in the operation of the machine to move the dressing element across the grinding member and means for actuating the same, a support on which the dressing element is mounted for movement relative to said carrier to feed said dressing element toward the grinding member and means for moving said support at predetermined intervals in the operation of the machine to feed the dressing element relative to the grinding member to compensate for the wear of said grinding member including a ratchet wheel having an operative connection with said support, an oscillatable pawl carrier, a pawl mounted on said carrier for operative engagement with the ratchet wheel and fluid pressure operated means for periodically oscillating said pawl carrier.

69. In a grinding machine, the combination with a work support, a grinding member, and means for operating said grinding member, of a carrier, a dressing element mounted on said carrier for movement across the surface of the grinding member periodically at predetermined intervals in the operation of the machine means for actuating said dressing element, and fluid pressure operated means for feeding said dressing element toward the grinding member at predetermined intervals in the operation of the machine comprising a piston having an operative driving connection with said dressing element, a cylinder in which said piston is movable, provided with ports for distributing fluid pressure to the respective ends of said piston and means for controlling the admission of the fluid pressure alternately to opposite ends of said piston.

70. In a grinding machine, the combination with a work support, a grinding member, and means for operating said grinding member, of a carrier, a dressing element mounted on said carrier for movement across the surface of the grinding member periodically at predetermined intervals in the operations of the machine and means for actuating said dressing element, and fluid pressure operated means for feeding said dressing element toward the grinding member at predetermined intervals in the operation of the machine comprising a piston having an operative connection with said dressing element, a cylinder in which said piston is movable provided with ports for distributing fluid pressure to the respective ends of said piston, means for controlling the admission of fluid pressure alternately to opposite ends of said piston and adjustable means for limiting the stroke of said piston to adjust the amount of said feed movement at each stroke of said piston.

71. In a grinding machine, the combination with a work support, a grinding member and means for operating the grinding member, of a carrier, a dressing element mounted on said carrier, means for moving said dressing element across the surface of the grinding member periodically at predetermined intervals in the operation of the machine, and fluid pressure operated means for feeding said dressing element toward the grinding member at predetermined intervals in the operation of the machine comprising a piston having an operative connection with said dressing element, a cylinder in which said piston is movable, provided with ports for distributing fluid pressure to the respective ends of said piston, a valve for controlling the admission of fluid pressure alternately to opposite ends of said piston and means for periodically and automatically moving said valve to change the direction of application of fluid pressure to said piston.

72. In a grinding machine, the combination with a work support, a grinding member and means for operating the grinding member, of a carrier, a dressing element mounted on said carrier, means for moving said dressing element across the surface of said grinding member periodically at predetermined intervals in the operation of the machine and fluid pressure operated means for feeding said dressing element toward the grinding member at predetermined intervals in the operation of the machine comprising a piston having an operative connection with said dressing element, a cylinder in which said piston is movable provided with ports for distributing fluid pressure to the respective ends of said piston, a valve for controlling the admission of fluid pressure alternately to opposite ends of said piston and means for periodically and automatically moving said valve to change the direction of application of the fluid pressure to said piston, said means being adjustable to vary the frequency of movement of said valve, thereby to vary the frequency of feed of said dressing element.

73. In a grinding machine, the combination with a work support, a grinding member and means for operating the grinding member, of a carrier, a dressing element mounted on said carrier for movement across the surface of said grinding member and means for actuating said dressing element periodically at predetermined intervals in the operation of the machine and fluid pressure operated means for feeding said dressing element toward the grinding member at predetermined intervals in the operation of the machine comprising a piston having an operative connection with said dressing element, a cylinder in which said piston is movable provided with ports for distributing fluid pressure to the respective ends of said piston, a valve for controlling the admission of fluid pressure alternately to opposite ends of said piston, a rotor provided with a plurality of fingers adjustable into position to engage said valve on rotation of said rotor, whereby by varying the number of fingers in engaging position the frequency of movement of said valve may be varied, and means for rotating said rotor.

74. In a grinding machine, a work support, a grinding member, means for actuating the grinding member, a dressing element, a carrier, a supporting member to which the dressing element is secured movably mounted on said carrier, fluid pressure operated means for periodically moving the carrier at predetermined intervals in the operation of the machine to move the dressing element across the face of the grinding member, and fluid pressure operated means for periodically moving said supporting member relative to said carrier to maintain the dressing element in operative relation to the grinding member, and adjustable means for controlling the relative timed relation of operation of the two fluid pressure operated means relative to each other and to the grinding operation.

75. In a grinding machine, a work support, a grinding wheel, a dressing device operable on the periphery of the grinding wheel at a point removed from its point of engagement with the work for dressing said grinding wheel while in operative position, and means for feeding the dressing device relative to the grinding wheel periodically at predetermined intervals in the operation of the machine.

76. In a machine for relieving cutter blades, a work spindle adapted to carry the blades to be relieved, a grinding member, means for adjusting the grinding member into operative relation with the cutter blade, means for rotating the work spindle, a cam simultaneously reciprocating said spindle to impart axial relieving movement thereto, and means for driving said cam in timed relation with the rotation of the work spindle.

77. In a machine for relieving cutter blades, a work spindle adapted to carry at one end the blades to be relieved, a grinding member, means for adjusting said grinding member into operative relation with the cutter blades, means for rotating the work spindle, a cam adapted to operate at the opposite end of the work spindle to impart axial relieving movements thereto, and means for driving said cam in timed relation with the rotation of the work spindle.

78. In a machine for relieving cutter blades, a work spindle adapted to carry on one end the blades to be relieved, a grinding member, means for adjusting the grinding member into operative relation with the cutter blades, means including a worm and worm wheel for rotating the work spindle, said worm wheel having a splined connection with said work spindle, a cam adapted to operate at the opposite end of the work spindle to impart axial relieving movements thereto, and means for driving said cam in timed relation with the means for rotating the work spindle.

JOSEPH GSTYR.